(12) United States Patent
Etcheverry et al.

(10) Patent No.: US 7,934,374 B2
(45) Date of Patent: May 3, 2011

(54) METHOD AND SYSTEM FOR COMBUSTION ENGINE PARTICULATE FILTER REGENERATION

(75) Inventors: Celine Etcheverry, Sceaux (FR); Fabien Godon, Ustaritz (FR); Eric Dufay, Itteville (FR); Adrien Pillot, Rueil Malmaison (FR)

(73) Assignee: Renault S.A.S., Boulogne Billancourt (FR)

( * ) Notice: Subject to any disclaimer, the term of this patent is extended or adjusted under 35 U.S.C. 154(b) by 277 days.

(21) Appl. No.: 12/158,212

(22) PCT Filed: Nov. 29, 2006

(86) PCT No.: PCT/FR2006/051245
§ 371 (c)(1),
(2), (4) Date: Dec. 19, 2008

(87) PCT Pub. No.: WO2007/071862
PCT Pub. Date: Jun. 28, 2007

(65) Prior Publication Data
US 2009/0199544 A1    Aug. 13, 2009

(30) Foreign Application Priority Data
Dec. 20, 2005    (FR) ...................... 05 12950

(51) Int. Cl.
*F01N 3/023*    (2006.01)
(52) U.S. Cl. .............. 60/295; 60/274; 60/297

(58) Field of Classification Search .............. 60/295, 60/297, 311
See application file for complete search history.

(56) References Cited

U.S. PATENT DOCUMENTS

| 2001/0022081 A1* | 9/2001 | Oguma et al. ............... 60/285 |
| 2002/0152746 A1 | 10/2002 | Mikami et al. |
| 2003/0115856 A1* | 6/2003 | Surnilla et al. ............... 60/285 |
| 2003/0154710 A1* | 8/2003 | Plote et al. ................... 60/277 |

FOREIGN PATENT DOCUMENTS

| EP | 1 245 801 | 10/2002 |
| EP | 1 647 687 | 4/2006 |
| JP | 2007 077030 | 3/1995 |

* cited by examiner

*Primary Examiner* — Thomas E Denion
*Assistant Examiner* — Jonathan Matthias
(74) *Attorney, Agent, or Firm* — Oblon, Spivak, McClelland, Maier & Neustadt, L.L.P.

(57) ABSTRACT

A method for regenerating a particulate filter in an exhaust system of a combustion engine. The method: (a) measures, every time the combustion engine is started, a parameter representative of a condition of the combustion engine and/or of the exhaust system, (b) when the measured parameter reveals that the engine and/or the exhaust system are cold, the parameter representative of the mass of accumulated soot measured before the engine was last turned off is frozen, (c) the deviation between the frozen mass parameter and the parameter representative of the mass measured at time t is continuously determined, and (d) when the deviation has been resolved by convergence, it is added to the frozen mass parameter and the resulting corrected value is used in an ongoing regeneration process.

6 Claims, 2 Drawing Sheets

METHOD AND SYSTEM FOR COMBUSTION ENGINE PARTICULATE FILTER REGENERATION

Figure 1:
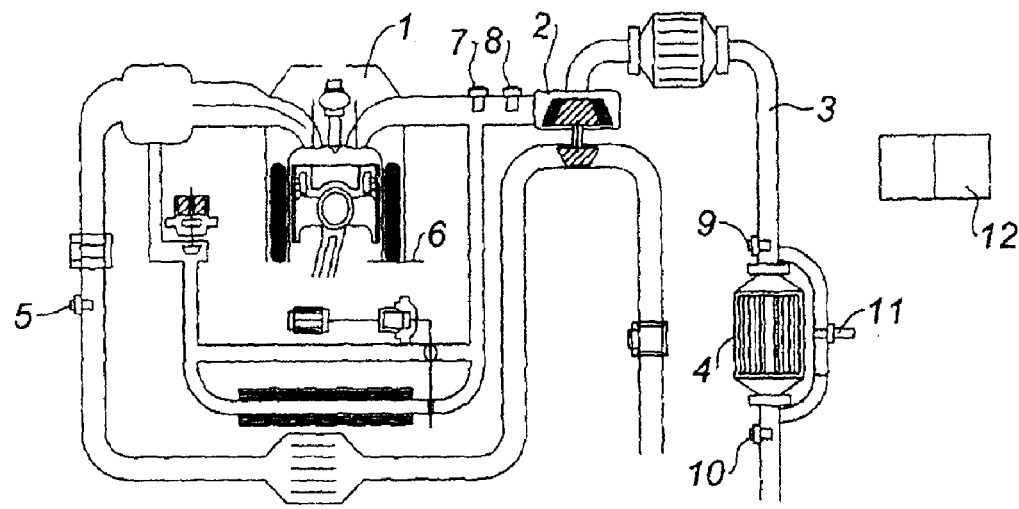

The present invention relates to a method and a system for regenerating the particulate filter placed in the exhaust line of an internal combustion engine, in particular of a diesel engine.

Today, the mass of soot stored in the particulate filter is either calculated from the difference in pressure between the inlet and outlet of the particulate filter in the exhaust line, or estimated by a particulate emission model which relates the engine parameters to the production of particulates.

The pressure drop measured across the filter or the quantity of particulates emitted during the running of the engine is directly related to the mass of soot contained in the filter. When this mass reaches a predefined level, the regeneration of the filter is initiated. The level of mass of soot stored in the filter above which regeneration is necessary is defined by the deterioration in engine performance caused by the increase in the pressure drop in the exhaust line. Overfrequent regenerations cause a significant dilution of diesel in the engine lubricating oil which, above a certain threshold, becomes dangerous for the integrity of the engine, and regenerations that are too widely spaced can lead to clogging of the filter, which itself can cause the disabling of the engine.

Particulate filter regeneration processes are described for example in FR2836956 and FR2864146.

The measurement of the pressure difference across the particulate filter does not allow an accurate estimate of the mass of soot stored in all the engine operating conditions. Thus, when the $NO_2$ emissions at the engine exhaust are high enough, a partial and nonuniform oxidation of the soot stored in the filter occurs, causing a decrease in the pressure drop across the filter. This decrease in the differential pressure is not proportional to the quantity of oxidized particulates, resulting in a difference between the mass of soot estimated by the differential pressure data and the mass of soot actually present in the filter.

Furthermore, part of the soot trapped in the filter is not burned during its regeneration.

These wastes that are stored in the filter cause an increase in the residual differential pressure across the filter, thereby decreasing the quantity of particulates that can be stored before reaching the threshold set for initiating the regeneration. In fact, the determination of the mass of waste present in the particulate filter is approximate today, giving rise to an uncertainty on the residual differential pressure across the filter and hence on the estimate of the mass of soot in the filter by the differential pressure measurement. It should be observed that this measurement uncertainty increases with time, at the same time as the mass of waste stored in the filter.

Moreover, during a starting in cold conditions or a prolonged shutdown, the differential pressure across the filter may drop sharply, because the condensation of water can reorganize the soot and liberate a number of channels.

The errors in estimating the quantity of particulates stored in the filter can then cause regenerations that are too frequent or too widely spaced, which, in all cases, is liable to cause the disabling of the engine.

It is the object of the present invention to remedy the drawbacks of the known methods and systems for regenerating particulate filters.

The invention thus relates to a method for regenerating the particulate filter placed in the exhaust line of an internal combustion engine in which a parameter representative of the mass of soot accumulated in the filter is measured, the regeneration of the filter is started when said representative parameter exceeds a predefined threshold, and the regeneration is stopped when said parameter falls below a certain threshold.

According to the invention, the regeneration method is characterized by the following steps:
a) every time the internal combustion engine is started, a parameter representative of the status of the internal combustion engine and/or of the exhaust line is measured,
b) when the measured parameter reveals that the engine and/or the exhaust line is/are cold, the parameter representative of the mass of soot accumulated, measured before the engine was last turned off, is frozen,
c) the difference between this frozen mass parameter and the parameter representative of the mass measured at time t is continuously determined,
d) when this difference has been resolved by convergence, the difference is added to the frozen mass parameter and this corrected value is used for the ongoing regeneration process.

The method according to the invention thus serves to avoid the cold detection of a mass of soot that is distorted by the condensation.

According to a preferred alternative embodiment of the invention, during the subsequent startups of the internal combustion engine:
when the measured parameter reveals that the engine and/or the exhaust line is/are cold, the representative mass parameter corrected according to step d) is frozen,
the difference between the frozen corrected mass parameter and the parameter representative of the mass measured at time t is continuously determined,
when this difference has been resolved by convergence, the difference is added to the frozen corrected mass parameter and this corrected value is used for the ongoing regeneration process.

In an advantageous embodiment of the invention, the parameter representative of the mass of soot accumulated in the filter is the pressure difference between the inlet and outlet of the filter.

Also preferably, the parameter representative of the status of the internal combustion engine and/or of the exhaust line is the temperature.

Advantageously, the process is reinitialized after each complete regeneration of the filter.

According to another aspect of the invention, the particulate filter regeneration system placed in the exhaust line of an internal combustion engine, comprising a unit for managing the regeneration of the filter, at least one sensor for measuring a parameter representative of the mass of soot accumulated in the filter, means for initiating the regeneration of the filter, when said parameter exceeds a predefined threshold, and for stopping the regeneration when said parameter falls below a certain threshold, is characterized in that it comprises:
a) at least one sensor for measuring, every time the internal combustion engine is started, a parameter representative of the status of the internal combustion engine and/or of the exhaust line,
b) means for freezing the parameter representative of the mass of soot measured before the engine was last turned off, when the sensor detects that the engine and/or the exhaust line is/are cold,
c) means for continuously determining the difference between the frozen mass parameter and the parameter representative of the mass measured at time t,
d) means for adding this difference to the frozen mass parameter, when this difference has been resolved by convergence to a stable value.

Other features and advantages of the invention will further appear throughout the description below.

Figure 2:
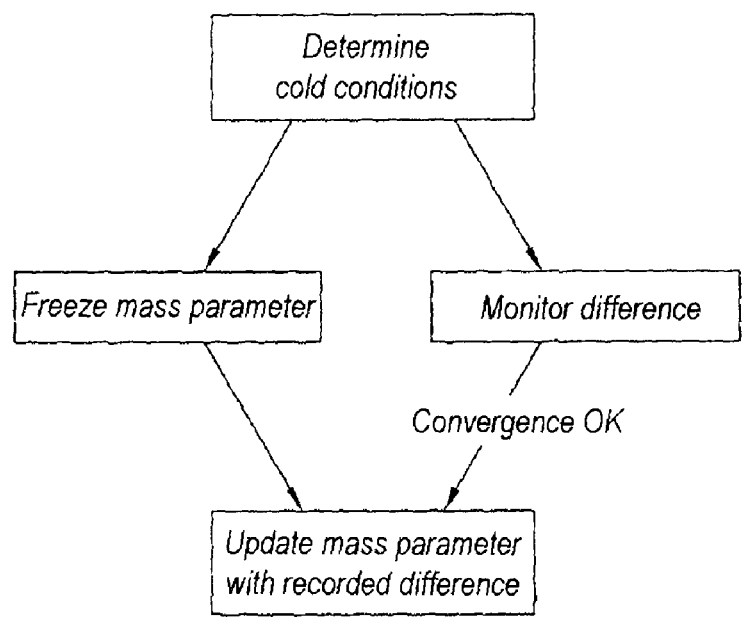
Figure 3:
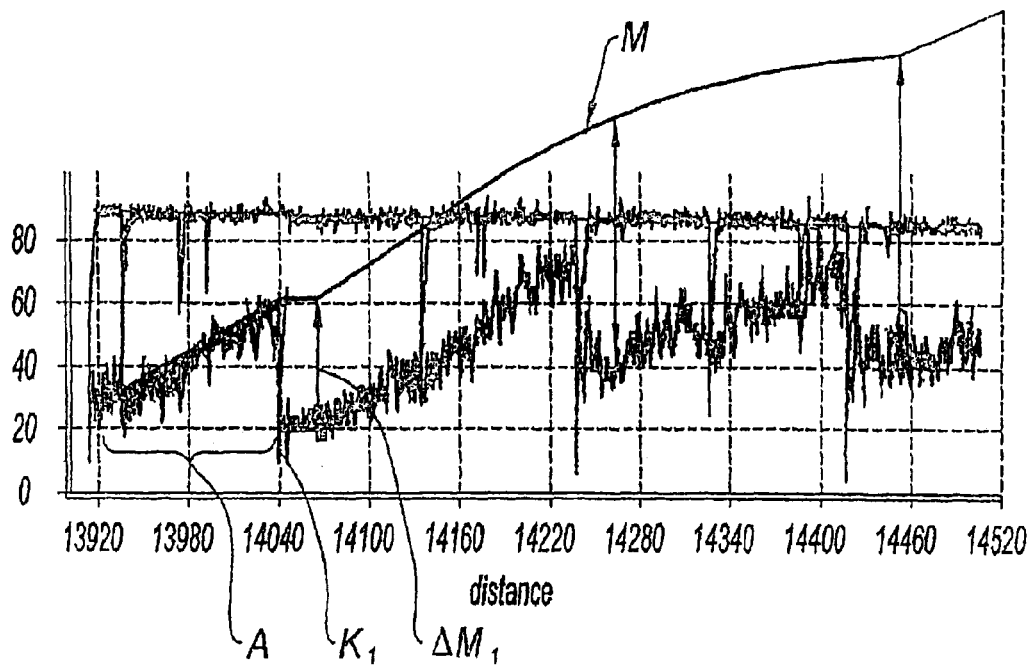
Figure 4:
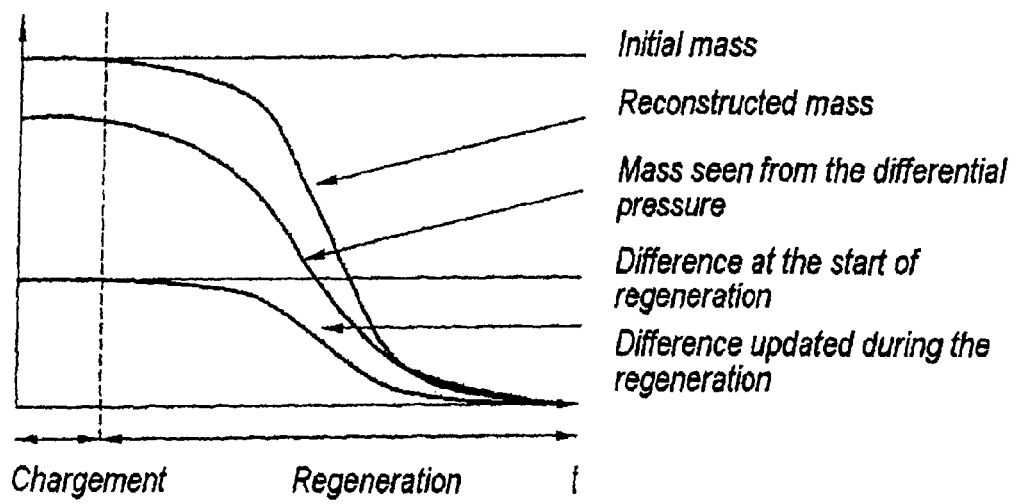

In the appended drawings, provided as non-limiting examples:

FIG. 1 is an overall diagram of a turbocharged diesel engine of which the exhaust line is equipped with a particulate filter, FIG. 2 is a flowchart illustrating the method according to the invention, FIG. 3 is a diagram showing the variation in mass of soot accumulated in a particulate filter as a function of the distance traveled, FIG. 4 is a diagram showing the variation in various calculated masses of soot as a function of time.

FIG. 1 shows a diesel engine 1 equipped with a turbocharger 2 of which the exhaust line 3 is provided with a particulate filter 4. Various sensors 5, 6, 7, 8, 9, 10, 11 are placed at several locations to measure parameters (temperature, pressure) and send them to a unit 12 for managing the regeneration of the filter 4.

In a manner known per se, the system for regenerating the particulate filter 4 comprises at least one sensor for measuring a parameter representative of the mass of soot accumulated in the filter 4, means for initiating the regeneration of the filter 4 when said parameter exceeds a predefined threshold and for stopping the regeneration when said parameter falls below a certain threshold.

The parameter representative of the mass of soot accumulated in the filter 4 may, for example, be the pressure difference between the inlet and outlet of the filter 4, measured by the sensors 9, 10, 11.

According to the method of the invention, every time that the internal combustion engine is started, one or more sensors are used to measure a parameter representative of the status or the conditions of the internal combustion engine and/or of the exhaust line. This status may be the temperature of the internal combustion engine and/or of the exhaust line. When the measured parameter, such as the temperature, reveals that the engine and/or the exhaust line is/are cold, implying the presence of condensation in the filter 4, the management unit 12 freezes the parameter representative of the mass of soot accumulated, measured just before the engine was last turned off. Thus the management unit does not take account of the mass of soot accumulated in the filter 4, after the engine has been started, because this mass is distorted by the condensation.

The management unit 12 then continuously determines the difference between the frozen mass parameter above and the parameter representative of the mass measured at time t.

When this difference has been resolved by convergence, that is when the measured temperatures of the internal combustion engine and/or of the exhaust line have become stable, the management unit 12 adds the above difference to the frozen mass parameter.

The management unit 12 then uses the corrected mass value above for the ongoing regeneration process.

The above steps are illustrated in FIG. 2.

During subsequent startups of the internal combustion engine:

when the measured parameter representative of the mass reveals that the engine and/or the exhaust line is/are cold, the unit freezes the corrected mass parameter (that is incremented with the above difference), the management unit then, as previously, determines the difference between the frozen corrected mass parameter and the parameter representative of the mass measured at time t, when this difference has again been resolved by convergence, the management unit 12 adds or increments this difference to the frozen corrected mass parameter and, this corrected mass value is used by the management unit 12 for the ongoing regeneration process.

FIG. 3 illustrates the above method.

In a first phase A, it shows a variation in the mass of soot up to a prolonged shutdown of the engine at the mileage $K_1$.

Upon restarting the engine, the mass is incremented by a difference $\Delta M_1$, which serves to obtain a reconstructed mass M.

After the engine has been turned off subsequently at mileages K1, K2, etc., ... the mass is again incremented by a value $\Delta M_2 + \Delta M_1$ and then $\Delta M_3 + \Delta M_2 + \Delta M_1$ and so on.

FIG. 4 shows the variation over time, after a period of loading of the management unit with the initial mass, of the mass determined by the differential pressure measured between the inlet and outlet of the filter 4, of the difference between the measured mass and the frozen mass at the start of regeneration, and the difference in mass updated during the regeneration.

The invention claimed is:

1. A system for regenerating a particulate filter placed in an exhaust line of an internal combustion engine, comprising:
   a unit configured to manage regeneration of the filter;
   at least one sensor configured to measure a parameter representative of mass of soot accumulated in the filter;
   means for initiating the regeneration of the filter, when the parameter exceeds a predefined threshold, and for stopping the regeneration when the parameter falls below a certain threshold;
   at least one sensor for measuring, every time the internal combustion engine is started, a parameter representative of a status of the internal combustion engine and/or of the exhaust line;
   means for freezing the parameter representative of the mass of soot measured before the engine was last turned off, when the sensor detects that the engine and/or the exhaust line is/are cold;
   means for continuously determining the difference between the frozen mass parameter and the parameter representative of the mass measured at time t; and
   means for adding the difference to the frozen mass parameter, when the difference has been resolved by convergence to a stable value.

2. A method for regenerating a particulate filter placed in an exhaust line of an internal combustion engine in which a parameter representative of mass of soot accumulated in the filter is measured, regeneration of the filter is started when the representative parameter exceeds a predefined threshold, and the regeneration is stopped when the parameter falls below a certain threshold, the method comprising:
   a) measuring, every time the internal combustion engine is started, a parameter representative of a status of the internal combustion engine and/or of the exhaust line;
   b) freezing, when the measured parameter reveals that the engine and/or the exhaust line is/are cold, the parameter representative of the mass of soot accumulated, measured before the engine was last turned off;
   c) continuously determining the difference between the frozen mass parameter and the parameter representative of the mass measured at a time t; and
   d) when the difference has been resolved by convergence, adding the difference to the frozen mass parameter and using the corrected value for an ongoing regeneration process.

3. The method as claimed in claim 2, wherein during subsequent startups of the internal combustion engine, the method further comprises:
- freezing, when the measured parameter reveals that the engine and/or the exhaust line is/are cold, the representative mass parameter corrected according to d),
- continuously determining the difference between the frozen corrected mass parameter and the parameter representative of the mass measured at time t, when this difference has been resolved by convergence, adding the difference to the frozen corrected mass parameter and using the corrected value for the ongoing regeneration process.

4. The method as claimed in claim 2, wherein the parameter representative of the mass of soot accumulated in the filter is pressure difference between the inlet and outlet of the filter.

5. The method as claimed in claim 2, wherein the parameter representative of the status of the internal combustion engine and/or of the exhaust line is temperature.

6. The method as claimed in claim 2, wherein the operations a) to d) are reinitialized after each complete regeneration of the filter.

* * * * *